US009148068B2

(12) United States Patent
Sarti

(10) Patent No.: US 9,148,068 B2
(45) Date of Patent: Sep. 29, 2015

(54) BACKUP POWER SYSTEM FOR RACK-MOUNTED EQUIPMENT

(71) Applicant: Facebook, Inc., Menlo Park, CA (US)

(72) Inventor: Pierluigi Sarti, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 504 days.

(21) Appl. No.: 13/693,530

(22) Filed: Dec. 4, 2012

(65) Prior Publication Data

US 2013/0154365 A1  Jun. 20, 2013

Related U.S. Application Data

(60) Provisional application No. 61/577,606, filed on Dec. 19, 2011.

(51) Int. Cl.
*H02M 7/06* (2006.01)
*H02J 9/00* (2006.01)
*H02J 9/06* (2006.01)
*H02J 3/18* (2006.01)

(52) U.S. Cl.
CPC .. *H02M 7/06* (2013.01); *H02J 9/00* (2013.01); *H02J 9/061* (2013.01); *H02J 3/1821* (2013.01); *H02J 3/1892* (2013.01); *Y02E 40/30* (2013.01); *Y10T 307/344* (2015.04); *Y10T 307/406* (2015.04)

(58) Field of Classification Search
CPC ........... H02M 7/06; H02J 9/00; H02J 3/1821; H02J 3/1892; Y02E 40/30; Y10T 307/344; Y10T 307/406
USPC ....................................................... 307/23, 31
See application file for complete search history.

(56) References Cited

U.S. PATENT DOCUMENTS

| 6,295,215 | B1 * | 9/2001 | Faria et al. ...................... 363/37 |
| 2003/0197428 | A1 * | 10/2003 | Hatton et al. .................... 307/82 |
| 2011/0057724 | A1 * | 3/2011 | Pabon ........................... 327/581 |

* cited by examiner

*Primary Examiner* — Rexford Barnie
*Assistant Examiner* — Toan Vu
(74) *Attorney, Agent, or Firm* — Fenwick & West LLP

(57) ABSTRACT

A power supply system for data center racks comprises a main power circuit including a power factor correction (PFC) module and a bypass power circuit in parallel to the main power circuit. During normal operation, the main power circuit provides power output because the output voltage of the PFC module in the main power circuit under normal conditions is higher than the output voltage of the bypass power circuit. When the PFC module in the main power circuit fails, the bypass power circuit provides power output in bypass operation. The bypass power circuit provides power by rectifying a three-phase AC current to produce an output suitable for equipment that uses DC power.

19 Claims, 4 Drawing Sheets

BACKUP POWER SYSTEM FOR RACK-MOUNTED EQUIPMENT

CROSS-REFERENCE TO RELATED APPLICATION

This application claims the benefit of U.S. Provisional Application No. 61/577,606, filed Dec. 19, 2011, which is incorporated by reference in its entirety.

BACKGROUND

This invention relates generally to data centers and in particular to providing power for rack-mounted equipment in a data center upon failure of a main power circuit in the power supply system for a rack.

With the advent of the Internet, data centers have become a practical and viable solution for cloud computing or any large-scale IT operations for business and services. A data center typically houses racks of computer servers, which provide both processing and data storage functionalities, as well as telecommunication and networking equipment, such as switches and routers, to support the communication requirements of the servers. Data center components are often collocated, where resources are shared across an organization or among multiple organizations.

Given the centralized nature of data centers, it is beneficial to maximize the service availability (e.g., 99.5% or greater in time) because downtime may result in severe consequences to those who rely on the data center and lost income to the data center operators. Since a primary cause of data center downtime is power failures, data centers are often equipped with backup power systems, such as uninterruptible power supplies (UPS) and generators. In addition, massive energy consumption by data centers causes increased resource depletion and greenhouse gas emission, among other environmental concerns. Accordingly, efficient power solutions are desired that not only guarantee high power availability, but are also cost-effective and environmentally-friendly.

SUMMARY

Embodiments of the present invention provide a power supply system that is coupled to supply electrical power to electronic equipment in a data center rack. The power supply system comprises a main power circuit and a bypass power circuit in parallel to the main power circuit. The main power circuit may comprise a power factor correction (PFC) module. Under normal conditions, the output voltage of the PFC module of the main power circuit is higher than the output voltage of the bypass power circuit. Therefore, during normal operation, the main power circuit provides power output to the equipment in the rack. When the PFC module in the main power circuit fails, a PFC bulk capacitor coupled to the output releases electrical current, and the output voltage of the PFC bulk capacitor drops below the output voltage of the bypass power circuit. This activates a bypass operation in which the bypass power circuit provides power output temporarily, e.g., until the faulty PFC module in the main power circuit can be replaced. The bypass circuit provides the necessary redundancy to the PFC module.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION

Embodiments of the invention provide integrated power solutions for racks used in data centers to provide backup power in the event of a failure of a component in a main power circuit, such as a PFC module. Although discussed in terms of rack-mounted equipment, embodiments of the invention need not be limited to any particular type of computing equipment or to equipment that is actually mounted in a rack or located in a data center.

Rack

Figure 1:
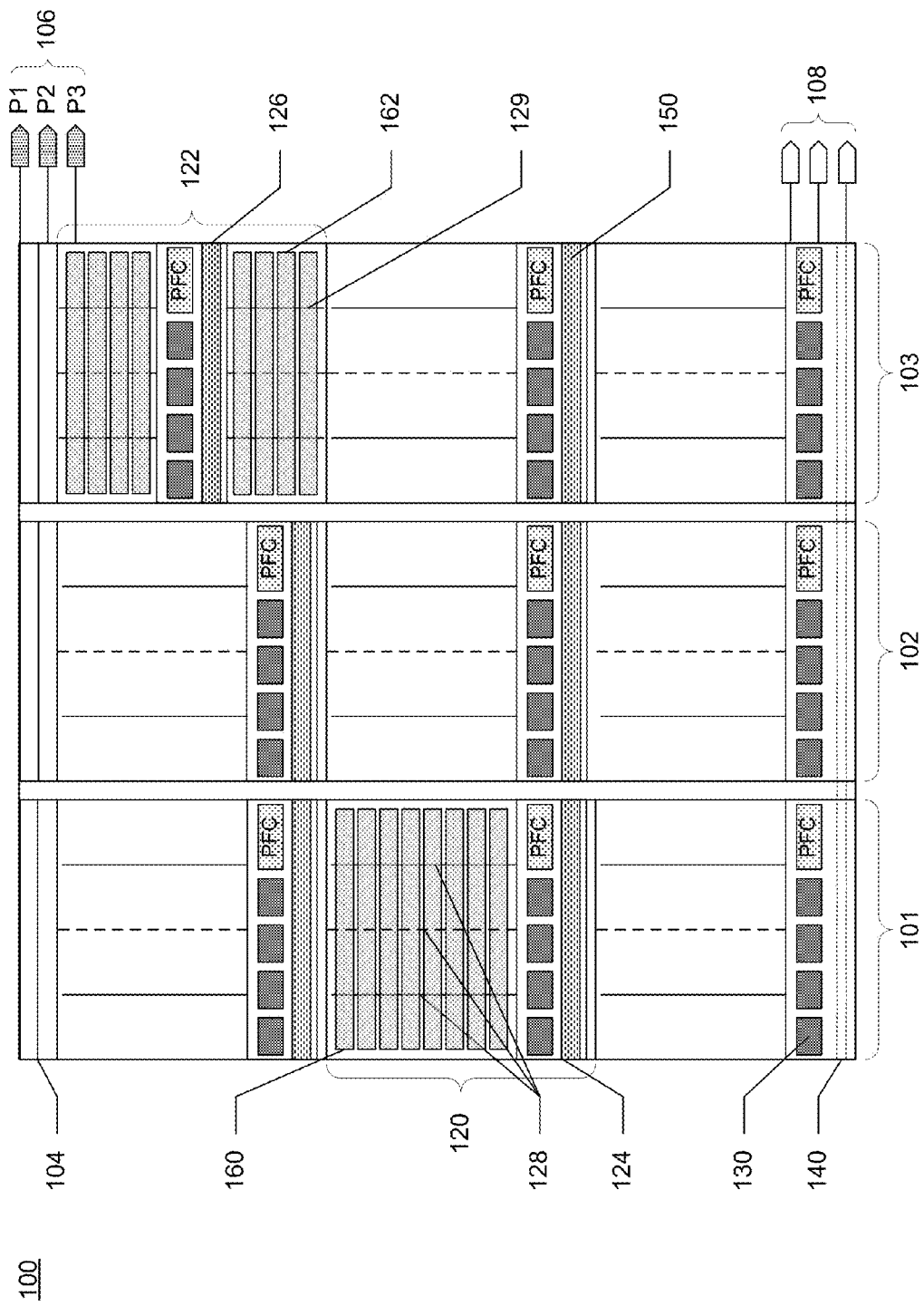
FIG. 1 is a block diagram illustrating a front view of a rack with an integrated power solution, in accordance with one embodiment.

FIG. 1 is a block diagram illustrating a front view of a rack 100 with an integrated power solution designed for a data center, according to one embodiment. The rack 100 comprises three rack columns 101-103, a top power rail 104 that may enclose power lines, breakers, receptacles and plugs at the back, three AC voltage input lines 106 with three-phase plugs P1, P2, and P3, and three optional DC voltage input lines 108 as a DC power source used for backup power when batteries are not embedded in the rack. Each of the columns 101-103 conforms to a standard 24-inch width, which can hosts server chassis up to 21 inches in width.

In each column, space is divided vertically into three power zones, each of which is equipped with an independent power shelf, two (optionally three) pairs of positive and negative 12V DC power bus bars called "buses," and space that accommodate one or more server chassis. The power shelf is a hot-swappable chassis mounted inside a power zone to provide power to all the devices installed in the power zone. The power shelf comprises one or more power source units with power factor correction modules and bypass circuits that draw power from the power grid or backup batteries. For example, power zone 120 is located in the middle of column 101, and it contains power buses 128. A power shelf 124 is installed at the bottom of the power zone. In each power zone, a battery backup unit (BBU) is reserved underneath the power shelf, such as the Li-Ion BBU 150 shown in FIG. 1. Normally, a backup battery unit (BBU) is embedded to provide DC backup power locally. The three power zones in the top, middle, and bottom rows of the rack are referred to as a rack triplet. When a three-phase power solution is adopted, the number of power zones could also be lowered from three to two.

Each power zone in the server rack 100 supports chassis of various sizes. A rack unit or U is a unit for the height of chassis mounted in the rack, where 1 U is 1.75 inches high. In a power zone with power shelf installed at the bottom, such as power zone 120, several chassis height of 1 U, 1.5 U, 2 U, etc. may be supported above the shelf. As shown in FIG. 1, eight server chassis 160 of height 1.5 U are installed in the power zone 120. Alternatively, the power shelf can be mounted in different positions inside the power zone. For example, the power zone 122 contains a power shelf 126 mounted in the middle, which divides the rack space into two equal parts. This arrangement minimizes the copper conduction losses of the power bars, Such as power buses 129, which distributes the 12V DC power to the server chassis 162 sitting in both parts of the power zone 122. Four 1.5 U chassis are currently shown mounted both above and under the power shelf 126 in the power zone 122 in FIG. 1. The power shelves 124 and 126 are 2 U in height (alternatively 1 U) while the BBU 150 is usually a 1 U slot.

In one embodiment, the rack 100 is coupled to the power grid as a three-phase load, with each of the rack columns 101, 102 and 103 powered by the three-phase plugs P1, P2, and P3 of the three-phase AC source 106. The three-phase voltage can be distributed through the following configurations:

1. For each power zone in a rack triplet: Line 1 to Neutral (L1-N) powers column 1, Line 2 to Neutral (L2-N) powers column 2, and Line 3 to Neutral (L3-N) powers column 3;
2. For each column in a rack: Line 1 to Neutral (L1-N) powers the top triplet, Line 2 to Neutral (L2-N) powers the middle triplet, and Line 3 to Neutral (L3-N) powers the bottom triplet;
3. In case of a true three-phase PFC module installed: Each power shelf is powered by Line 1, Line 2, and Line 3 (L1-L2-L3) with no neutral conductor.

To achieve any of the above configurations, three AC power distribution units (PDUs) 140 are installed in the back of the rack. The PDUs 140 may be mounted either vertically or horizontally, and they may distribute single-phase or three-phase voltages. An example of a horizontally mounted PDU 140 is shown in dotted line in FIG. 1. The PDU 140 lies horizontally across three columns behind the three power shelves installed in the triplet, the design of which minimizes the PDU cost and power distribution cost. In the configuration 3 listed above, the three-phase PFC solution provides load balancing without a neutral current because the neutral conductor is not used.

The three-phase plugs P1, P2, and P3 can be used for all three configurations to reduce the cost of connectors, sockets, and breakers. The DC backup voltage input 108 is provided for connecting to external battery racks as backup power when BBUs are not installed in the power zones. To use the backup voltage input 108, DC PDUs are installed at the back of the rack. In this case, PDUs not only distribute online AC but also offline DC voltages. For example, a PDU can distribute 277V AC RMS (root mean square) Line to Neutral, or 480V AC RMS Line to Line for the online AC voltage, and 48V DC for the DC offline backup voltage. Each triplet in the server rack 100 is coupled to such a PDU as mentioned above.

In one embodiment, the power shelf (e.g., power shelf 124) installed in a power zone (e.g., power zone 120) contains one 4.2 KW PFC module and (N+1) 1.4 KW DC-DC PSU modules (e.g., PSU 130), of which N PSUs are working units, plus one redundant unit. Hence, the power shelf has a maximum power output of 4.2 KW+1.4 KW for a (N+1) redundancy. In FIG. 1, each power shelf is equipped with (3+1) DC-DC PSUs. The PFC module is also redundant by a bypass power circuit using the AC grid voltage directly as a power source when the PFC fails, or the PFC is hot swapped from the shelf. This is equivalent to a (1+1) redundancy of the PFC module.

In one embodiment, the power modules and server chassis are hot-swappable in server rack 100. In this embodiment, a server chassis may house two motherboards side by side, each with a hot-swappable power connector coupled to one of the power buses. The power bus may comprise twin-rectangle bars (one positive pole and one for negative pole to distribute current) made of copper, with a cross section sufficient to support electrical current when electrical components are fully installed in the power zone and the power shelf is running at its full capacity. The power efficiency loss for the cross section chosen is around 0.9% at full load due to heat generated by the copper bar if the power shelf is mounted at the bottom of the power zone (e.g., power bus 128). This efficiency loss ratio can be reduced to about 0.3% by placing the power shelf in the middle of the power zone (e.g., power bus 129) because the current on the power buses is split in half. However, this arrangement limits the heights of the chassis supported and the flexibility of the installation of the chassis in the power zones, due to the more limited room.

Power Supply Circuits

The server rack 100 in a data center relies on AC power grids as the main energy source. Power grids generally comprise one or more power generation systems, coupled together with a power-transferring capable conduit, such as power lines. When power is unavailable on all or part of the power grid, the power grid is said to be "down" or experiencing "downtime." Power downtime may be caused by a variety of factors, including over-consumption of available power by users, the failure or unavailability of a power generation system, a failure or breach in power conduit within the power grid, or any other cause that results in a power user being unable to draw power from the power grid. In such instances, other power sources may continue to supply power to the extent they are able, and power users may continue to draw power from these other power sources as long as the power users are connected these other power sources.

In one embodiment, each power zone in the server rack 100, as described above, is powered with three 1.4 KW DC-DC PSU modules for a total power of 4.2 KW, plus one redundant 1.4 KW module. These DC-DC PSU modules are powered by a 4.2 KW power factor correction (PFC) module (one in each power shelf). The PFC module includes inside (2+1) DC-DC converters called "backup converters," each outputting 2.1 KW power based on the isolated current feed topology, with a (N+1) redundant scheme. These converters start immediately at AC grid outage in conjunction with a low BULK voltage status in the PFC. The converters then step-up the DC battery voltage to the BULK voltage with a 2.1 KW power output each. As a result, the BULK voltage is continuously supplied even during AC power outage, so that the 1.4 KW DC-DC PSU modules continue to deliver voltage output without service interruption and without output voltage glitches on the 12V. A simple random restart feature may be implemented in the PFC, which helps smooth out the AC emergency generator startup current, disabling randomly the backup function at AC recover.

Power shelves are ready for future upgrades by swapping PFC modules and DC-DC PSU modules. The backup topology selected provides highly reliable backup performance without glitches in voltage output during transitions of AC outages and AC restores. The batteries (typically Li-Ion batteries) can be one pack or multiple packs, for example, one for each DC-DC backup converter. The latter configuration allows each individual battery pack to be tested directly with the online server load. The battery packs can supply power in sharing mode with the PFC BULK voltage during the test with each battery pack releases constant current.

One parameter used to evaluate the power efficiency is the power factor. Due to sinusoidal waveform and phase shifting, a non-corrected AC-DC power supply is typically with a power factor measured at 65%, which can draw approximately one and a half times greater input current than a PFC supply with a typical power factor of 99% for the same output loading. PFC modules can be passive and active. The PFC module may be implemented in digital technology, with interleaved topology to increase the efficiency at light load. The interleave topology may also be implemented in both PFC and all the mentioned DC-DC modules to improve efficiency profile versus load.

To address the needs of reliable and efficient power access for data centers, embodiments of the invention provide a backup power system that comprises a redundant power circuit. In this way, if the PFC module fails in the power shelf and the power supply voltage therefore falls, the redundant power circuit kicks in to provide backup power until the PFC is replaced. This redundancy scheme, using the AC power grid as a backup power for the BULK voltage when PFC fails or removed from the shelf, obviates the need for a costly backup PFC for each power shelf. The backup power system does not provide power factor correction in the event of PFC failure until a working PFC module is restored, but it does avoid disruption of service because it maintains the requisite 12V power supply on the power buses in the rack.

Figure 2:
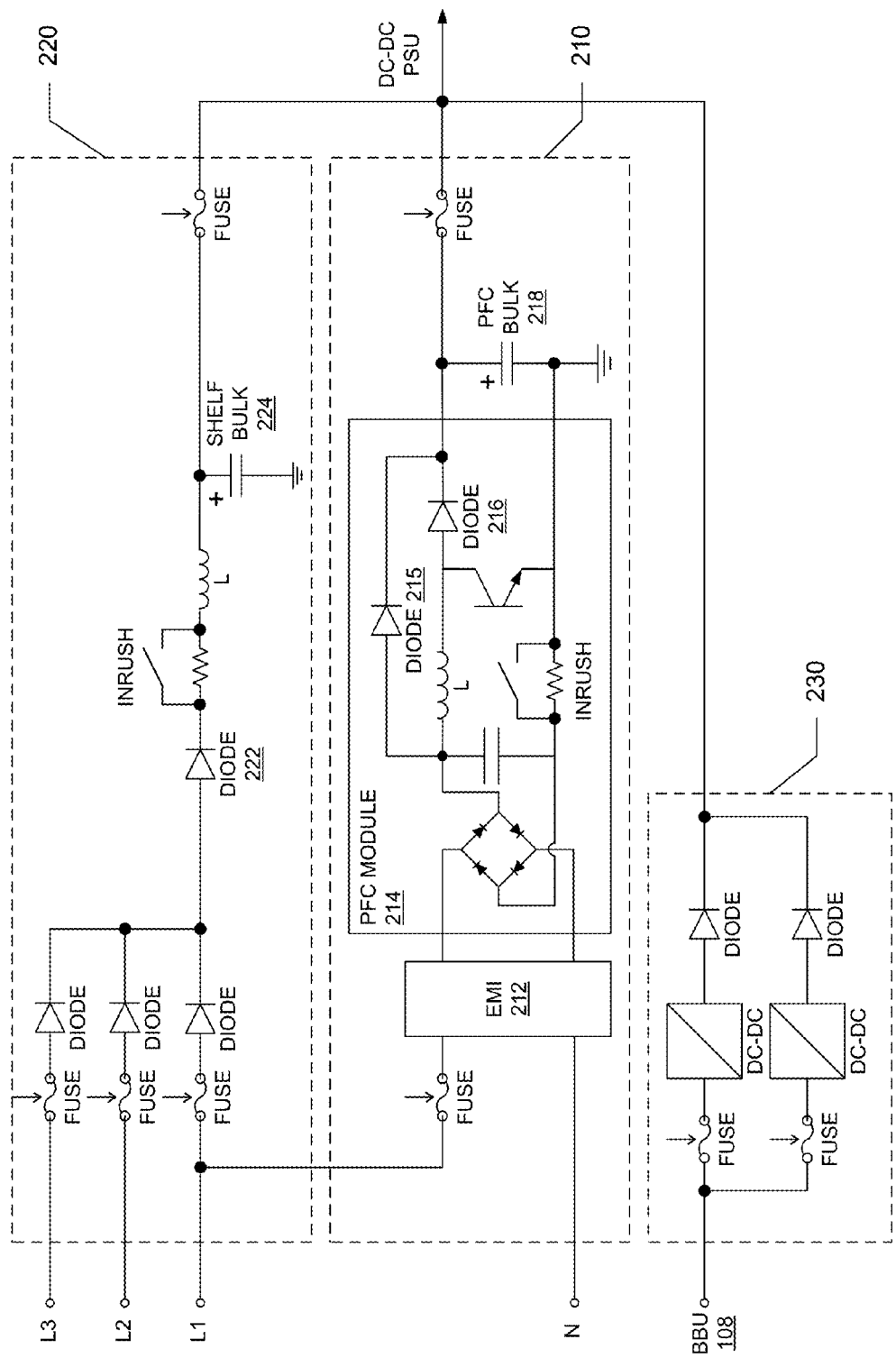
FIG. 2 is a schematic of a power supply system with a single-phase PFC, in accordance with one embodiment.

FIG. 2 is a schematic of a power supply solution with single-phase PFC, in accordance with one embodiment. The power supply circuit comprises three parts: a main PFC power circuitry 210, a PFC bypass power circuit 220, and a DC backup circuit 230 with DC input from BBU 108. The main power circuit 210 draws power from one of the three-phase AC power lines (e.g., L1 in FIG. 2) in case of single-phase PFC in this example. The power input goes through an electromagnetic interference (EMI) filter with inrush control 212, a single-phase PFC module 214, and a PFC bulk capacitor 218 to output. The redundant PFC voltage bypass circuitry 220 shown in single-phase PFC solution, on the other hand, always draws power from all three lines L1-L2-L2 of the power grid, rectifies the power through a half bridge rectifier 222 for this example, and passes it to the output over a bulk capacitor 224.

In both the main power circuit 210 and the bypass power circuit 220, the diodes 215, 216 and 222 ensure that the electrical current flows from the power lines to the output, and not in the reverse direction. The bulk capacitor 218 coupled to the PFC module 214 is a separated component from the capacitor 224 included in the redundant PFC bypass circuitry, which sits in the shelf. This allows the DC-DC module to continue working even without the presence of the PFC module in the power shelf. By dubbing up the total BULK capacitance (218+224), the holdup time is doubled, which provides smooth transitions between the main and backup circuits during AC outages and AC restores. In addition, the BULK capacitance reduces the input DC startup current from the batteries due to a slower backup transition. Reduced startup current during the backup transition avoids sudden dips in the battery voltage resulting from the impedance of the connections to the batteries, and the battery impedance itself. It also reduces the low frequency ripple voltage when the PFC fails and the BULK capacitor is supplied by the PFC bypass circuitry 220, which can adopt a three-phase half-bridge solution when the PFC is a single-phase topology. The FUSEs throughout the circuitry guarantees the PFC redundancy in case of hard failure of the PFC module. In one embodiment, in the single-phase PFC solution shown in FIG. 2, the diode 316 and the BULK capacitor 318 may be included in the PFC module, while the BULK capacitor 324 (and a separate inrush limitation circuit) together with the rest of the bypass circuitry 320 is installed separately in the power shelf.

In one embodiment, during normal operation, the PFC module 214 in the main power circuit 210 outputs 4.2 KW for the power shelf at its full capacity (for simplicity, a unity efficiency factor for the PFC and DC-DC modules has been assumed). The power output is provided by the main power circuit 210, rather than by the PFC bypass circuitry path 220, because the output voltage of the PFC module 214 under normal conditions is higher than the output voltage of the bypass circuit 220.

If the PFC module 214 fails, the bulk capacitor 218 releases its electric charge. However, the output voltage of the bulk capacitor 218 drops until the voltage is lower than the output voltage of the PFC bypass circuitry path 220, which activates to sustain the BULK voltage so that the DC-DC modules do not discontinue the 12V output. In this way, the backup power system takes over for the main power system to supply electrical power to the rack.

Figure 4A:
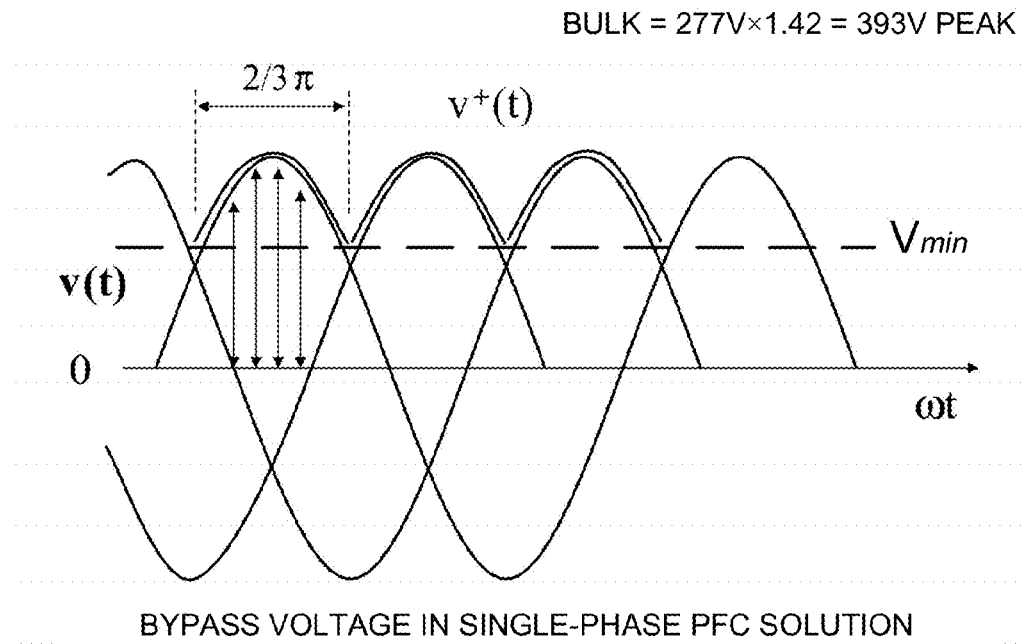
FIG. 4A is a graph of an example bypass voltage waveform in a single-phase PFC solution, in accordance with one embodiment.

During this bypass operation due to PFC failure, the DC-DC modules draw power directly from each of the lines L1-L2-L3 of the three-phase power grid instead of a single line for single-phase PFC solution (with the half-bridge rectifier through the bypass circuitry), and directly from line to line for the three-phase PFC solution (with the full-bridge rectifier through the bypass circuitry). For this example with single-phase PFC solution, the power input of the lines L1-L2-L3 are combined and rectified with a half-bridge three-phase rectifier (3 diodes). This produces a sinusoidal waveform such as the one shown in FIG. 4A, with a lower ripple than just rectifying the single-phase with only one bypass diode and with a higher DC component (rectified voltage never drop to zero volt). A benefit of the waveform shown in FIG. 4A is that the voltage is maintained above a certain level $V_{min}$ (e.g., around 393V compared to PFC output of 440V), which provides a sufficient output power for powering the server rack temporarily while waiting for the PFC to be replaced.

Once the failed PFC module is replaced and the bulk capacitor 318 is charged by the working PFC, the main power circuit 210 will be back online. In particular, the main power circuit 210 will output a voltage that is higher than the backup power circuit 220 and therefore provide power to the rack instead of the back power circuit 220. Beneficially, the 12V output by the power shelf is present through the outage period. Although power factor correction is lost during this period of PFC failure, the transition period is a temporary condition for the affected power shelf.

Figure 3:
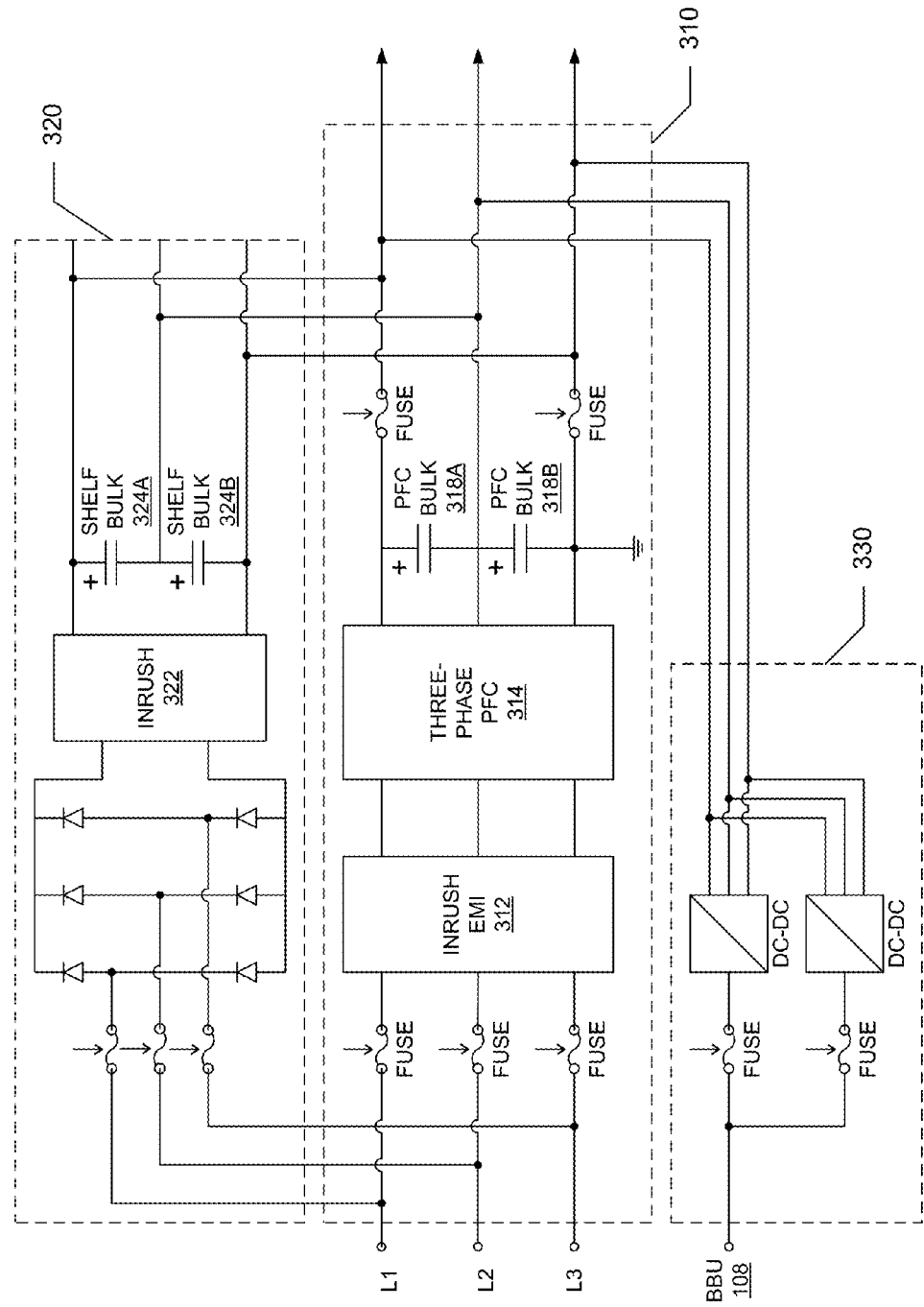
FIG. 3 is a schematic of a power supply system with a three-phase PFC, in accordance with an embodiment.

FIG. 3 is a diagram illustrating an example of a power supply circuit with a three-phase PFC module, in accordance with one embodiment. This is the equivalent power solution for a three-phase input without neutral. Similar to the single-phase power supply circuit shown in FIG. 2, the power supply circuit comprises three parts: a main PFC power circuitry 310, a PFC bypass power circuit 320, and a DC backup circuit 330 with DC input from BBU 108. In this example, the main power circuit 310 draws power from all of the three-phase AC power lines (e.g., L1-L3 in FIG. 3) instead of from only one line in case of single-phase PFC. The BULK capacitors 318 are implemented by coupling two capacitors in series in a three-phase PFC, which may reach a BULK voltage of 800V in one embodiment. The redundant PFC voltage bypass circuitry 320 also draws power from all three lines L1-L2-L3 of the power grid, rectifies the power through three-phase full-bridge diodes, and passes it to the output over a pair of bulk capacitor 324.

Figure 4B:
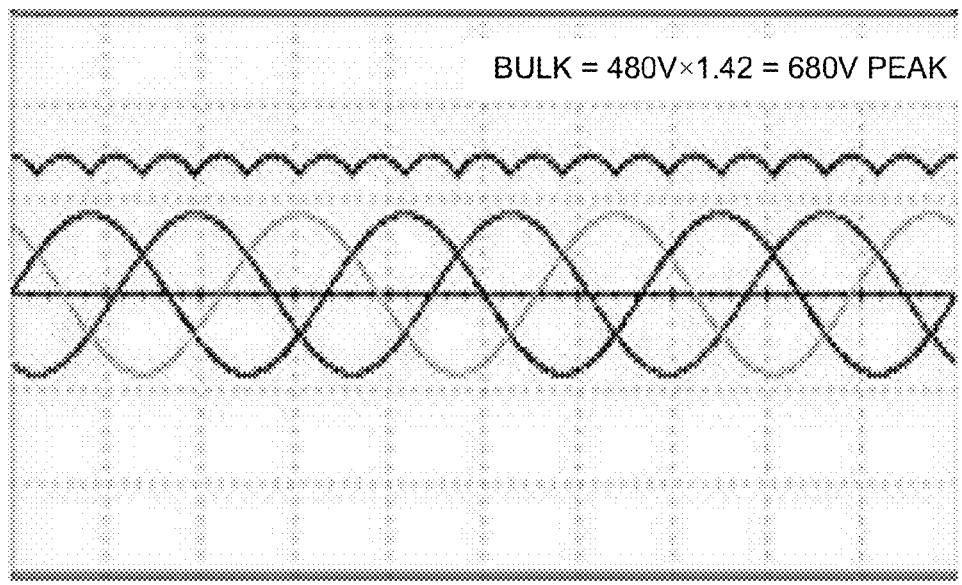
FIG. 4B is a graph of an example bypass voltage waveform in a three-phase PFC solution, in accordance with an embodiment.

During normal operation, the main power circuit 310 provides power output, because the output voltage of the PFC module 314 under normal conditions (e.g., 800V) is higher than the output voltage of the bypass circuit 320. If the PFC module 314 fails, the bulk capacitors 318 release its electric charge. However, the output voltage of the bulk capacitors 318 drops until the voltage is lower than the output voltage of the PFC bypass circuitry path 320, which activates to sustain the BULK voltage so that the DC-DC modules do not discontinue the 12V output. During bypass operations due to PFC failure, the DC-DC modules draw power directly from the lines L1-L3-L3 of the three-phase power grid (with rectifier through the bypass circuitry). In this example, the power input of the lines L1-L3-L3 are so combined and rectified with a full-bridge three-phase rectifier (6 diodes), producing a sinusoidal waveform. Although the bypass circuit 320 outputs a lower voltage (e.g., 680V compared to PFC output of 800V shown in FIG. 4B), it provides a sufficient power for powering the server rack temporarily while waiting for the PFC to be replaced.

Summary

The disclosed embodiments may provide several advantages in implementation. First, the DC-DC modules are simple and cost effective, as they do not require external backup power circuits to supply non-disruptive 12V voltage output (or any other output voltage level desired) during power losses and restores. The embodiments may also avoid output voltage glitches during backup transitions, while the usage of a single PFC module also helps to drive other functions at shelf level, like the random restart at AC restore. Redundancy of the PFC is achieved using the path through the bypass circuit, which is normally offline and does not dissipate any power.

The circuit discussed with respect to FIG. 2 and FIG. 3 is merely exemplary; other PFC backup circuit may be used and are in no way excluded from inclusion in alternative embodiments of the invention. For example, the PFC bypass circuitry design can be used in other environments, not limited to power shelves. In addition, the BBU may be provided with an online battery test. Redundancy of the backup power circuitry, PFC module, and DC-DC modules may also be included. A centralized PFC placed in the power shelf facilitates future upgrades, and its higher power rating compared to PFC normally installed in single module AC-DC power supply allows easy implementation of interleaved topology and other interesting features not easy to implement in a low power PFC. Lastly, high voltage DC (HVDC) is distributed inside the power shelf. Hence, the power shelf (and so the rack when this shelf is used) is also ready to accept HVDC input instead of AC voltage from the power grid in case HVDC distribution is readily available in the data center and can be applied directly input to the DC-DC modules with minimum customizations of connectors and some work on safety compliance.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A power supply system comprising:
   an input from three-phase alternating current (AC) power grid lines;
   an output for supplying electrical power to rack-mounted computing equipment;
   a main power circuit including a power factor correction (PFC) module and a PFC bulk capacitor coupled to the output, wherein the main power circuit is configured to draw power from one or more of the three-phase power grid lines; and
   a bypass power circuit including a rectifier and a shelf bulk capacitor coupled in parallel to the PFC bulk capacitor, wherein the bypass power circuit is configured to draw power from each of the power grid lines, and rectify the three-phase AC current from the power grid lines to produce a rectified output across the shelf bulk capacitor,
   wherein the main power circuit is configured to provide electrical power to the output during normal operation, and the bypass power circuit is configured to provide electrical power to the output during bypass operation upon failure of the PFC module.

2. The system of claim 1, further comprising a direct current (DC) backup power circuit with DC input from a battery backup unit coupled to the output.

3. The system of claim 1, wherein the rectifier is a half-bridge rectifier.

4. The system of claim 1, wherein the output voltage of the PFC module in the main power circuit under normal conditions is higher than the output voltage of the bypass power circuit, thereby causing the main power circuit to provide electrical power to the output during normal operation.

5. The system of claim 4, wherein the output voltage of the PFC module in the main power circuit under normal conditions is approximately 440V, and wherein the output voltage of the bypass power circuit is approximately 393V.

6. The system of claim 1, wherein the main power circuit includes one or more diodes coupled to prevent current flows from the output back into the main power circuit.

7. The system of claim 1, wherein the bypass power circuit includes one or more diodes coupled to prevent current flows from the output back into the bypass power circuit.

8. The system of claim 1, wherein upon failure of the PFC module, the bypass operation starts when the PFC bulk capacitor coupled to the output releases electrical current and the output voltage of the PFC bulk capacitor drops below the output voltage of the bypass power circuit.

9. A power supply system comprising:
   an input from three-phase alternating current (AC) power grid lines;
   an output for supplying electrical power to rack-mounted computing equipment;
   a main power circuit including a power factor correction (PFC) module and a pair of PFC bulk capacitors in serial coupled to the output, wherein the main power circuit is configured to draw power from each of the three-phase power grid lines; and
   a bypass power circuit including a rectifier and a pair of shelf bulk capacitors in serial coupled in parallel to the pair of PFC bulk capacitors, wherein the bypass power circuit is configured to draw power from each of the power grid lines, and rectify the three-phase AC current from the power grid lines to produce a rectified output across the shelf bulk capacitor,
   wherein the main power circuit is configured to provide electrical power to the output during normal operation, and the bypass power circuit is configured to provide electrical power to the output during bypass operation upon failure of the PFC module.

10. The system of claim 9, further comprising a direct current (DC) backup power circuit with DC input from a battery backup unit coupled to the output.

11. The system of claim 9, wherein the rectifier is a full-bridge rectifier.

12. The system of claim 9, wherein the output voltage of the PFC module in the main power circuit under normal conditions is higher than the output voltage of the bypass power circuit, thereby causing the main power circuit to provide electrical power to the output during normal operation.

13. The system of claim 12, wherein the output voltage of the PFC module in the main power circuit under normal conditions is approximately 800V, and wherein the output voltage of the bypass power circuit is approximately 680V.

14. The system of claim 9, wherein the main power circuit includes one or more diodes coupled to prevent current flows from the output back into the main power circuit.

15. The system of claim 9, wherein the bypass power circuit includes one or more diodes coupled to prevent current flows from the output back into the bypass power circuit.

16. The system of claim 9, wherein upon failure of the PFC module, the bypass operation starts when the pair of PFC bulk capacitors coupled to the output releases electrical current and the output voltage of the pair of PFC bulk capacitors drops below the output voltage of the bypass power circuit.

17. A method comprising:
receiving three-phase alternating current (AC) power at an input of a power system;
during normal operation of the power system, operating a main power circuit to process the received AC power from one or more of the three phases of the received AC power using a power factor correction (PFC) module and outputting the processed AC power across a PFC bulk capacitor connected to an output of the power system;
detecting a failure of the main power circuit; and
responsive to detecting the failure of the main power circuit, operating a bypass power circuit to rectify the received AC power from each of the three phases of the received AC power to produce a rectified output across the output of the power system.

18. The method of claim 17, wherein the output voltage of the PFC module in the main power circuit under normal conditions is higher than the output voltage of the bypass power circuit, thereby causing the main power circuit to provide electrical power to the output during normal operation.

19. The method of claim 17, wherein upon failure of main power circuit, the bypass operation starts when the PFC bulk capacitor coupled to the output releases electrical current and the output voltage of the PFC bulk capacitor drops below the output voltage of the bypass power circuit.

* * * * *